Oct. 19, 1965     A. E. VISIN     3,212,355
CONTROL MECHANISM
Filed Sept. 12, 1962
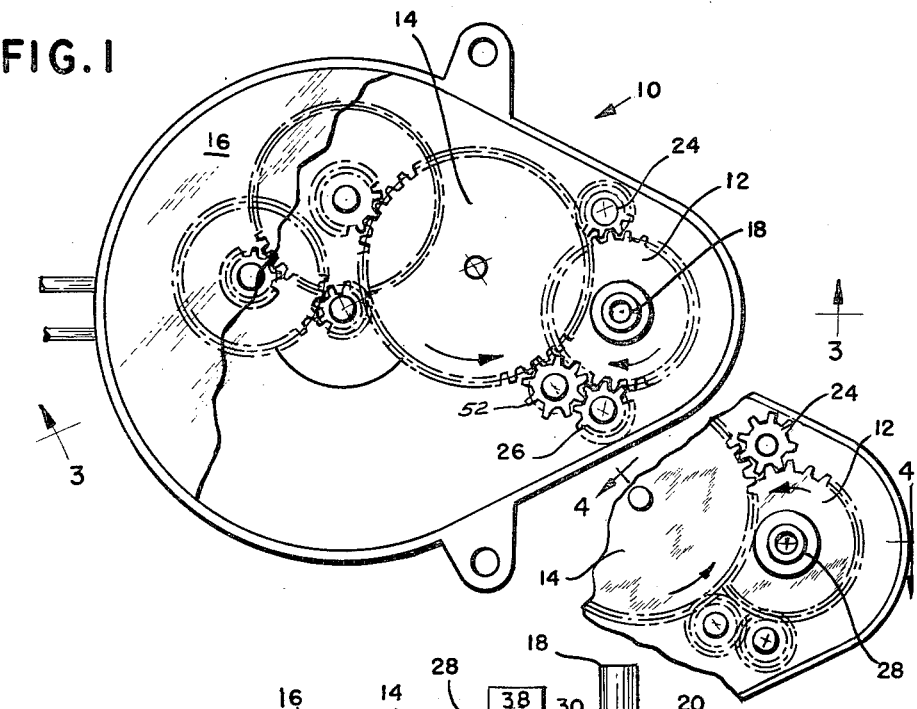
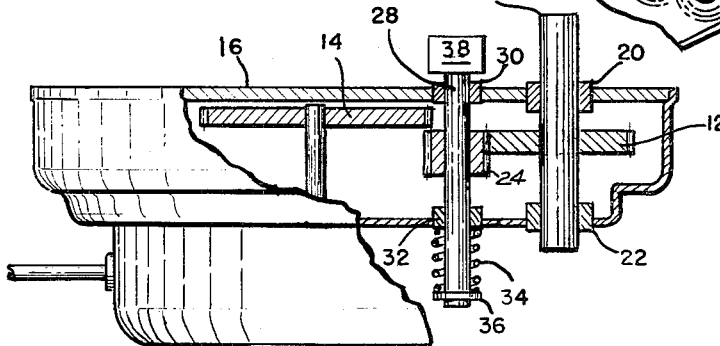
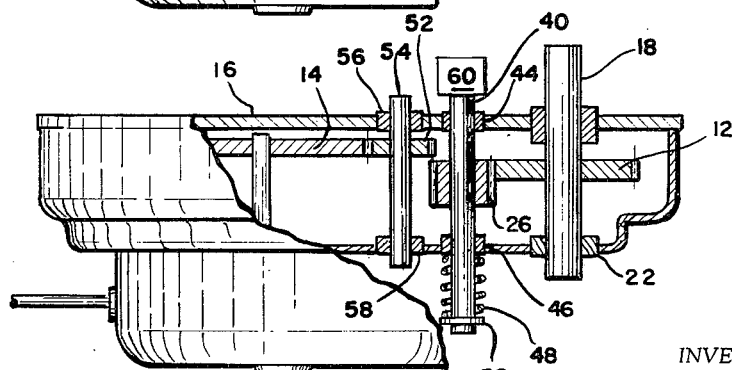
INVENTOR.
Allan E. Visin
BY
*Bayard H. Michael*
Attorney United States Patent Office 3,212,355
Patented Oct. 19, 1965

3,212,355
CONTROL MECHANISM
Allan E. Visin, Crystal Lake, Ill., assignor to Controls Company of America, Melrose Park, Ill., a corporation of Delaware
Filed Sept. 12, 1962, Ser. No. 223,190
3 Claims. (Cl. 74—625)

This invention relates to volume control devices and, more particularly, to a drive for a remotely operable volume control device.

An object of this invention is to provide a remote volume control device having a reversible drive with a manual over-ride and wherein the drive positively assumes its operative positions and does not require hunting for the manual over-ride position.

Another object of this invention is to provide a relatively inexpensive and simply constructed remote volume control device.

For the achievement of these and other objects of this invention, a drive is provided for a remotely operable volume control device which includes an output gear adapted to be connected for direct manual control, a drive gear which is driven through a suitable gear train, and coupling gears mounted for independent movement between the drive and output gears to selectively establish a driving connection therebetween. The coupling gears each have a normal position wherein they do not establish a driving connection between the drive gear and the output so as to provide a manual over-ride whereby the volume control can be manipulated manually without working against the gear train or the drive gear. The coupling gears are operative to establish connections between the drive and output gears such that the output gear can be selectively driven in opposite directions to provide a completely reversible drive for the volume control.

Other objects and advantages will be pointed out in, or be apparent from, the specification and claims, as will obvious modifications of the single embodiment shown in the drawings, in which:

FIG. 1 is a plan view of the drive in one of its remotely operative positions;

FIG. 2 is a plan view of the drive in another one of its remotely operative positions;

FIG. 3 is a partial sectional view taken generally along lines 3—3 of FIG. 1 but illustrating a portion of the drive in a manual over-ride position; and FIG. 4 is a partial sectional view taken generally along lines 4—4 of FIG. 2 and illustrating another portion of the drive in a manual over-ride position.

With particular reference to the drawings, a remotely operable volume control 10 includes an output gear 12 and a drive gear 14 which is driven by an electric motor (not shown) through a suitable gear train 16. The output gear is mounted on a shaft 18 which is rotatably supported by bushings 20 and 22. Shaft 18 is suitably connected to a potentiometer (not shown), or similar electrical volume control apparatus. The volume control can thus be manipulated manually by rotation of shaft 18 or can be operated remotely by establishing a driving connection between the output and drive gears.

For remote operation, volume control 10 is also provided with coupling gears 24 and 26 which are mounted for movement between the output and drive gears. More particularly, gear 24 is mounted on a shaft 28 which is supported in the volume control by bushings 30 and 32 for both axial and rotational movement.

Spring 34 is seated between bushing 32 and washer 36, which is mounted on shaft 28, and biases gear 24 into a normal position wherein it is disengaged from drive gear 14 and engages only output gear 12. The axial length of gear 24 is sufficient to establish a driving connection between the output and drive gears. Suitable means such as solenoid 38 is provided to move shaft 28 axially against the bias of spring 34 to engage coupling gear 24 between the output gear and driving gear. Referring to FIG. 2, gear train 16 drives output gear 14 counterclockwise and coupling gear 24 transmits this movement to and rotates output gear 12 in a counterclockwise direction. When solenoid 38 is de-energized, spring 34 returns gear 24 to its normal position where it is disengaged from the drive gear.

Coupling gear 26 is operative to establish a connection to rotate the output gear in the opposite direction, i.e. clockwise. Coupling gear 26 is mounted on a shaft 40, which shaft is supported by bushings 44 and 46 for rotatable and axial movement. Spring 48 is seated between bushing 46 and washer 50, which is carried by shaft 40, to bias gear 26 into its normal position wherein it is disengaged from drive gear 14 and engages only output gear 12. Similar to coupling gear 24, gear 26 has an axial length sufficient to establish a driving connection between the output and drive gears but, in this instance, an idler gear 52 is provided between gear 26 and the drive gear to achieve a reversal of direction. Idler gear 52 is carried by shaft 54 which is supported for rotation by bushings 56 and 58 but is held against axial movement so that the idler gear continuously engages the drive gear. Solenoid 60 is connected to shaft 40 for moving the shaft axially against the bias of spring 48 to engage coupling gear 26 between the idler gear and the output gear. With the drive connection established through the idler gear and coupling gear 26, the output gear is driven clockwise (see FIG. 1) and when solenoid 60 is de-energized the coupling gear is returned to its normal position by spring 48.

Volume control 10 can be operated in opposed directions by selective energization of the solenoids 38 and 60 or manually when the solenoids are de-energized. The return springs 34 and 48 positively locate the coupling gears when the solenoids are de-energized so that the output gear is disengaged from the drive gear. Thus there is no hunting for the manual control position, on the contrary, the manual over-ride is positively established when the solenoids are de-energized and manual control is accomplished without working against the remote control gear train. Accordingly, a completely reversible volume control is provided when operated both remotely and manually. An effective and efficiently operating remotely, or manually, operable volume control is then provided, but one wherein economy and simplicity of construction are maintained.

Although but one embodiment of the present invention has been illustrated and described, it will be apparent to those skilled in the art that various changes and modifications may be made therein without departing from the spirit of the invention or from the scope of the appended claims.

What I claim is:

1. Drive mechanism adapted for selective manual and remote operation and comprising, in combination, a drive gear, an output gear normally operatively disconnected from said drive gear when said drive gear is operative and inoperative, a first coupling gear having a first position in engagement with one of said drive and output gears and mounted for movement to a second position to establish an operative connection between said drive and output gears, means biasing said first coupling gear to one of said first and second positions thereof, means for moving said first coupling gear against said bias from said one position to the other of said first and second positions, an idler gear in continuous engagement with one of said drive and output gears, a second coupling gear having a first position in engagement with one of said idler gear and the other of said drive and output gears and mounted for movement to a second position to establish an operative connection between said idler gear and said other of said drive and output gears, means biasing said second coupling gear to one of said first and second positions thereof, and means for moving said second gear against said bias from said one position to the other of said first and second positions, whereby said output gear can be selectively rotated in opposite directions by said drive gear and independently of said drive gear without working against said gear.

2. Drive mechanism adapted for selective manual and remote operation and comprising, in combination, a drive gear, means mounting said drive gear for rotation, an output gear, means mounting said output gear for rotation and normally operatively disconnected from said drive gear, a first coupling gear, means supporting said first coupling gear for rotational movement and axial movement between a first position in engagement with only one of said drive and output gears and a second position in engagement between said drive and output gears to establish an operative connection therebetween, an idler gear, means supporting said idler gear for rotation and in engagement with only one of said drive and output gears, a second coupling gear, means supporting said second coupling gear for rotational movement and for axial movement between a first position in engagement with only one of said idler gear and the other of said drive and output gears and a second position in engagement between said idler gear and said other of said drive and output gears to establish an operative driving connection therebetween, said drive, output, idler and first and second coupling gears arranged on parallel axes, means biasing said first and second coupling gear to one of said first and second positions thereof, and means for moving said first and second coupling gears axially against said bias from said one of said first and second positions to the other of said first and second positions thereof to selectively connect said output gear to said drive gear for rotation in opposite directions.

3. A volume control device adapted for selective manual and remote operation and comprising, in combination, an output gear, an output member connected to and rotatable with said output gear, a drive gear, means mounting said drive gear for rotation and normally operatively disconnected from said output gear when said drive gear is operative and inoperative, a first coupling gear, means mounting said first coupling gear for rotation and for axial movement between a first position in engagement with only one of said drive and output gears and a second position in engagement with both said output and drive gears to establish a driving connection therebetween, an idler gear, means supporting said idler gear for rotation and in continuous engagement with one of said output and drive gears, a second coupling gear, means mounting said second coupling gear for rotation and for axial movement between a first position in engagement with one of said idler gear and the other of said drive and output gears and a second position in engagement between said idler gear and said other of said drive and output gears to establish an operative driving connection therebetween, said drive, output, idler and first and second coupling gears arranged on parallel axes, and means biasing said first and second coupling gears to one of their first and second positions and solenoid means connected to said first and second coupling gears and operable to move said first and second idler gears selectively against said biasing means to the other of their first and second positions to selectively connect said output gear to said drive gear for rotation in opposite directions.

References Cited by the Examiner
UNITED STATES PATENTS 1,592,889 7/26 Knight _____ 74—404 X
2,149,570 3/39 Barrett _____ 74—625 X BROUGHTON G. DURHAM, *Primary Examiner.*